United States Patent
Boyd

(10) Patent No.: US 9,356,700 B2
(45) Date of Patent: May 31, 2016

(54) EPON/EPOC TIME DIVISION DUPLEX (TDD) MODE

(71) Applicant: Broadcom Corporation, Irvine, CA (US)

(72) Inventor: Edward Boyd, Petaluma, CA (US)

(73) Assignee: Broadcom Corporation, Irvine, CA (US)

( * ) Notice: Subject to any disclaimer, the term of this patent is extended or adjusted under 35 U.S.C. 154(b) by 290 days.

(21) Appl. No.: 13/907,573

(22) Filed: May 31, 2013

(65) Prior Publication Data

US 2014/0010537 A1    Jan. 9, 2014

Related U.S. Application Data

(60) Provisional application No. 61/668,737, filed on Jul. 6, 2012.

(51) Int. Cl.
*H04B 10/27* (2013.01)
*H04Q 11/00* (2006.01)

(52) U.S. Cl.
CPC ........... *H04B 10/27* (2013.01); *H04Q 11/0067* (2013.01); *H04Q 11/0071* (2013.01); *H04Q 2011/0064* (2013.01)

(58) Field of Classification Search
CPC .................................................. H04Q 11/0071
See application file for complete search history.

(56) References Cited

U.S. PATENT DOCUMENTS

| | | | | |
|---|---|---|---|---|
| 2007/0014575 A1* | 1/2007 | Kramer et al. | | 398/71 |
| 2009/0162065 A1* | 6/2009 | Mizutani et al. | | 398/66 |
| 2010/0239252 A1* | 9/2010 | Davis et al. | | 398/58 |
| 2010/0316387 A1* | 12/2010 | Suvakovic | | H04J 3/1694 398/98 |
| 2012/0257891 A1* | 10/2012 | Boyd et al. | | 398/45 |
| 2012/0257893 A1* | 10/2012 | Boyd et al. | | 398/58 |
| 2012/0288279 A1* | 11/2012 | Zhang | | H04B 10/272 398/66 |
| 2013/0044766 A1* | 2/2013 | Pantelias | | 370/468 |
| 2013/0125194 A1* | 5/2013 | Finkelstein et al. | | 725/129 |
| 2013/0202293 A1* | 8/2013 | Boyd et al. | | 398/38 |
| 2013/0239165 A1* | 9/2013 | Garavaglia et al. | | 725/129 |
| 2013/0315595 A1* | 11/2013 | Barr | | 398/67 |
| 2013/0322882 A1* | 12/2013 | Fang et al. | | 398/67 |

* cited by examiner

*Primary Examiner* — Nathan Curs
(74) *Attorney, Agent, or Firm* — Sterne, Kessler, Goldstein & Fox P.L.L.C.

(57) ABSTRACT

Embodiments enable a half-duplex Time Division Duplex (TDD) mode for Ethernet Passive Optical Network (EPON) or EPON over Coax (EPoC) networks. Specifically, embodiments provide systems and methods for enabling an Optical Line Terminal (OLT)/Coaxial Line Terminal (CLT) to share a physical medium spectrum in time with the Optical Network Units (ONUs)/Coaxial Network Units (CNUs) that it services. In an embodiment, the OLT/CLT includes an EPON scheduler that can schedule downstream and upstream transmissions over the same physical medium spectrum. In another embodiment, the OLT/CLT is equipped with a burst mode transmit physical layer (PHY) module, which can be controlled by an EPON Medium Access Control (MAC) module, to transmit in burst mode over the physical medium. In a further embodiment, there is provided an ONU/CNU with a burst mode receive PHY module. The burst mode receive PHY module can maintain clock timing even with non-continuous reception from the OLT/CLT.

20 Claims, 7 Drawing Sheets

EPON/EPOC TIME DIVISION DUPLEX (TDD) MODE

CROSS-REFERENCE TO RELATED APPLICATIONS

The present invention claims the benefit of U.S. Provisional Application No. 61/668,737, filed Jul. 6, 2012, which is incorporated herein by reference in its entirety.

FIELD OF THE INVENTION

The present disclosure relates generally to a time division duplex (TDD) mode for Ethernet Passive Optical Network (EPON) or EPON over Coax (EPoC).

BACKGROUND

Background Art

A typical mode of operation for Ethernet Passive Optical Network (EPON) and EPON over Coax (EPOC) includes dividing the spectrum provided by the physical medium in wavelength or frequency into a downstream communication channel and an upstream communication channel. The downstream communication channel utilizes separate wavelengths/frequencies than the upstream communication channel, making this mode a full-duplex mode. In the downstream, transmission is continuous from the Optical Line Terminal (OLT) or Coaxial Line Terminal (CLT) and reception is continuous by the Optical Network Units (ONUs) or Coaxial Network Units (CNUs). In the upstream, transmission is controlled by the OLT/CLT to enable time sharing of the upstream communication channel by the ONUs/CNUs.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 1:
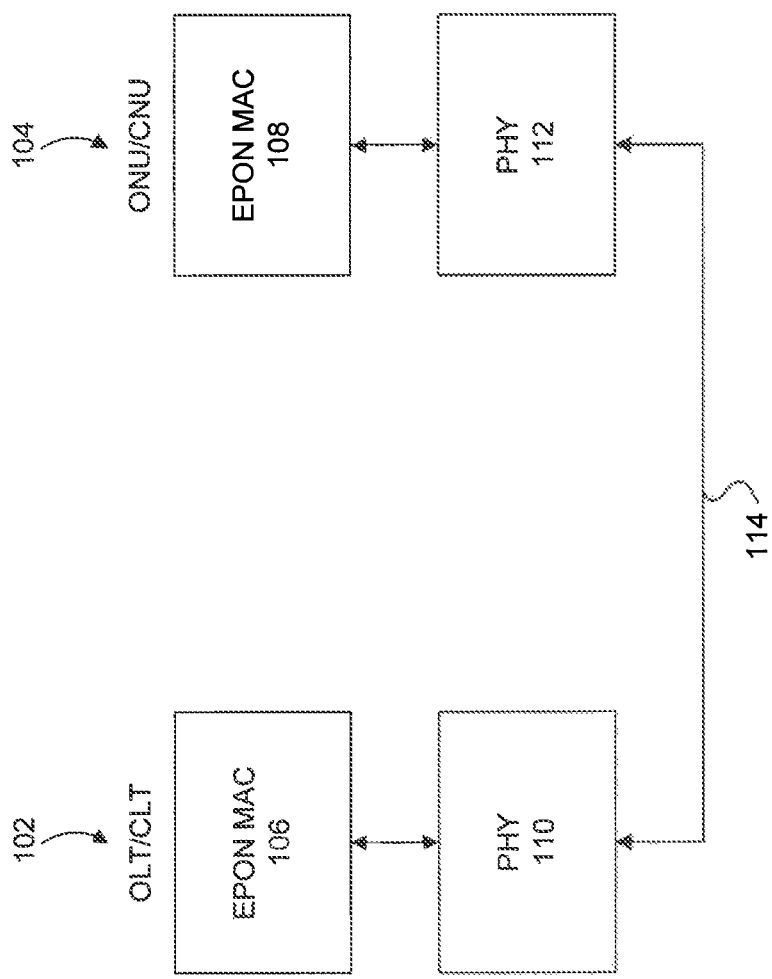
FIG. 1 illustrates an example Ethernet Passive Optical Network (EPON) or EPON over Coax (EPoC) architecture.

FIG. 1 illustrates an example Ethernet Passive Optical Network (EPON) or EPON over Coax (EPoC) architecture 100. Example architecture 100 is provided for the purpose of illustration only and is not limiting of embodiments. As shown in FIG. 1, example architecture 100 includes an Optical Line Terminal (OLT) or Coaxial Line Terminal (CLT) 102, coupled via a physical medium 114, to an Optical Network Unit (ONU) or Coaxial Network Unit (CNU) 104. Physical medium 114 can include an optical fiber and/or a coaxial cable, or can be a wireless medium.

OLT/CLT 102 includes, among other components, an EPON Medium Access Control (MAC) module 106 and a physical layer (PHY) module 110. ONU/CNU 104 includes, among other components, an EPON MAC module 108 and a PHY module 112. In the case that physical medium 114 is an optical fiber, EPON MAC modules 106 and 108 and PHY modules 110 and 112 can be implemented, for example, as defined in the IEEE 802.3 standard specifications, which provide service provider side (OLT) and subscriber side (ONU) MAC and (optical) PHY layers for EPON. In the case that physical medium 114 is a coaxial cable or a wireless medium, EPON MAC modules 106 and 108 can still be implemented as defined in the IEEE 802.3 standard specifications, for example. PHY modules 110 and 112, however, implement coaxial or wireless PHY layers. In either case, an end-to-end EPON MAC link can be established between OLT/CLT 102 and ONU/CNU 104.

Figure 2:
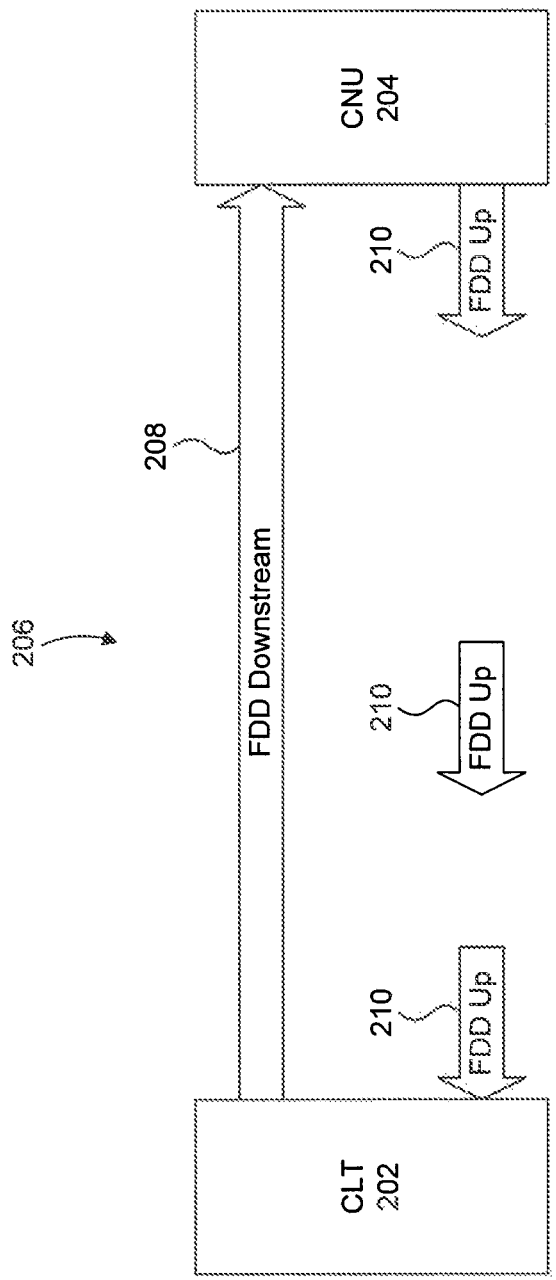
FIG. 2 is an example that illustrates an EPoC Frequency Division Duplex (FDD) mode.

FIG. 2 is an example 200 that illustrates an EPoC Frequency Division Duplex (FDD) mode. Example 200 is provided for the purpose of illustration and is not limiting of embodiments. As shown in FIG. 2, example 200 illustrates an EPoC link, established over a coaxial cable 206, between a CLT 202 and a CNU 204. CLT 202 and CNU 204 can be similar to CLT 102 and CNU 104 respectively, described with respect to FIG. 1 above.

The FDD mode illustrated in FIG. 2 is a typical mode of operating an EPoC network, and includes dividing the radio frequency (RF) spectrum provided by coaxial cable 206 in frequency into a downstream communication channel, from CLT 202 to CNU 204, and an upstream communication channel, from CNU 204 (and any other CNUs being serviced by CLT 202) to CLT 202. The downstream communication channel utilizes separate frequencies than the upstream communication channel, making this mode a full-duplex mode.

Because the downstream communication channel is used exclusively by CLT 202 to transmit to CNU 204 (and any other CNUs serviced by CLT 202), typically, CLT 202 transmits continuously over the downstream communication channel to produce a continuous downstream traffic 208. CNUs serviced by CLT 202, including CNU 204, are configured to receive continuously over the downstream communication channel to receive downstream traffic 208.

The upstream communication channel is shared by CNUs serviced by CLT 202, including CNU 204. As such, the upstream traffic from CNU 204 (or any other CNU serviced by CLT 202) to CLT 202 consists of multiple upstream bursts 210. Depending on the load of the upstream communication channel, CLT 202 may or may not receive continuously over the upstream communication channel in order to receive the upstream bursts 210 from the various CNUs that it services.

EPON networks typically use an analogous mode to the EPoC FDD mode illustrated in FIG. 2. Specifically, in Wavelength Division Multiplexing (WDM), the optical fiber connecting the OLT and the ONU(s) serviced by the OLT is divided in wavelength into a downstream communication channel, from the OLT to the ONU(s), and an upstream communication channel, from the ONU(s) to the OLT. The downstream communication channel utilizes separate light wavelengths than the upstream communication channel, making WDM a full-duplex mode. In the downstream, transmission is continuous from the OLT and reception is continuous by the ONU(s). In the upstream, transmission is controlled by the OLT to enable time sharing of the upstream communication channel by the ONU(s) and is therefore bursty from any one ONU to the OLT.

With the ever increasing demand for bandwidth, situations can arise where the spectrum provided by a physical medium (e.g., optical fiber, coaxial cable, wireless channel) is not large enough to support the full-duplex EPoC FDD mode or EPON WDM mode. For example, the physical medium (or the portion of it dedicated to the EPON/EPoC link) can be a single wavelength optical fiber or a single frequency band coaxial cable. In these situations, splitting the physical medium into non-overlapping downstream and upstream channels can be technically unfeasible (or even impossible) and/or may violate the relevant EPON/EPoC standards.

Embodiments enable a half-duplex Time Division Duplex (TDD) mode for EPON or EPoC networks. Specifically, embodiments provide systems and methods for enabling an OLT/CLT to share a physical medium spectrum in time with the ONU(s)/CNU(s) that it services. In an embodiment, the OLT/CLT includes an EPON scheduler that can schedule downstream and upstream transmissions over the same physical medium spectrum. In another embodiment, the OLT/CLT is equipped with a burst mode transmit PHY module, which can be controlled by an EPON MAC module, to transmit in burst mode over the physical medium. In a further embodiment, there is provided an ONU/CNU with a burst mode receive PHY module. The burst mode receive PHY module can maintain clock timing even with non-continuous reception from the OLT/CLT.

Figure 3:
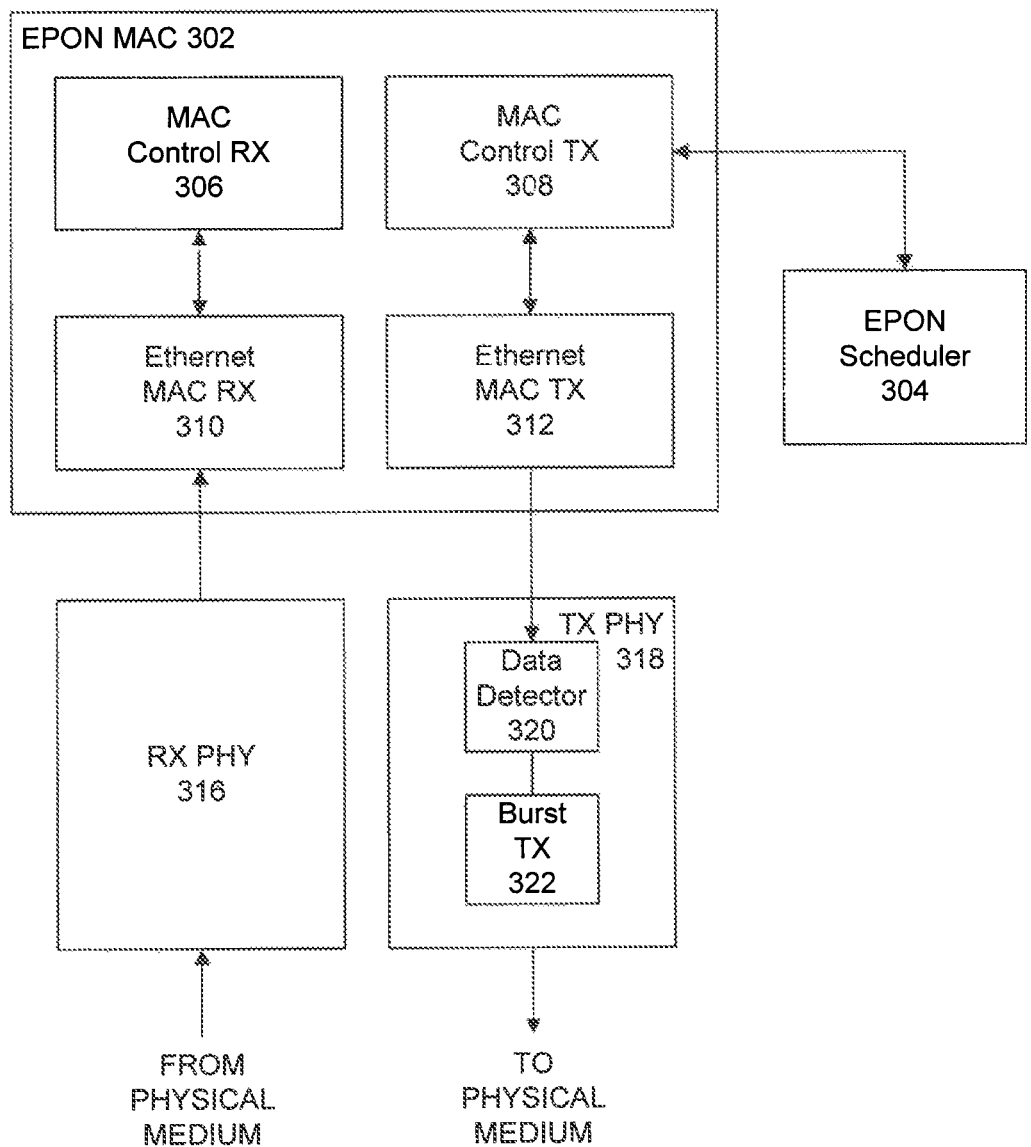
FIG. 3 illustrates an example Optical Line Terminal (OLT) or Coaxial Line Terminal (CLT) according to an embodiment.

FIG. 3 illustrates an example Optical Line Terminal (OLT) or Coaxial Line Terminal (CLT) 300 according to an embodiment. Example OLT/CLT 300 is provided for the purpose of illustration only and is not limiting of embodiments. As would be understood by a person of skill in the art based on the teachings herein, example OLT/CLT 300 can be implemented using any combination of hardware, software, and/or firmware.

As shown in FIG. 3, OLT/CLT 300 includes an EPON MAC module 302, an EPON scheduler 304, a receive PHY module 316, and a transmit PHY module 318. Receive PHY module 316 and transmit PHY module 318 can be implemented within a single PHY module. Receive PHY module 316 and transmit PHY module 318 can be coaxial PHY modules for receiving and transmitting over a coaxial cable, optical PHY modules for receiving and transmitting over an optical fiber, or wireless PHY modules for receiving and transmitting wirelessly. As shown in FIG. 3, receive PHY module 316 and transmit PHY module 318 are connected to a physical medium, which can be an optical fiber, a coaxial cable, or a wireless interface.

EPON MAC module 302 includes a MAC control receive module 306, a MAC control transmit module 308, an Ethernet MAC receive module 310, and an Ethernet MAC transmit module 312. MAC control receive module 306 and MAC control transmit module 308 can be implemented within a single MAC control module. Similarly, Ethernet MAC receive module 310 and Ethernet MAC transmit module 312 can be implemented within a single Ethernet MAC module.

EPON MAC module 302 can implement a service provider side EPON MAC layer as defined in the IEEE 802.3 standard specifications. Additionally, EPON MAC module 302 can be configured to reserve downstream transmission slots for OLT/CLT 300 over the physical medium. Downstream transmission slots can be on-demand (fixed or variable size) or pre-configured to occur periodically.

In an embodiment, EPON MAC module 302, via MAC control transmit module 308, sends a reservation message to EPON scheduler 304. The reservation message includes a desired time duration for a downstream transmission slot over the physical medium. In an embodiment, the reservation message includes a Multi-Point Control Protocol (MPCP) Report message, which includes the size of a downstream queue of EPON MAC module 302. In another embodiment, the reservation message is in the form of a control signal that provides information regarding the size of the downstream queue (e.g., similar information to what is found in a Report message). In another embodiment, EPON scheduler 304 is pre-configured to provide fixed size downstream transmission slots, and EPON MAC module 302 only signals EPON scheduler 304 that it requires a downstream transmission slot.

EPON scheduler 304 is configured to schedule upstream transmissions, from the ONU(s)/CNU(s) serviced by OLT/CLT 300 to OLT/CLT 300, as well as downstream transmissions, from OLT/CLT 300 to the ONU(s)/CNU(s) serviced by OLT/CLT 300. In an embodiment, EPON scheduler 304 is configured to receive the reservation message from EPON MAC module 302 and to send a control signal to EPON MAC module 302 (e.g., to MAC control transmit module 308) responsive to the reservation message. In an embodiment, the control signal identifies a downstream transmission slot on the physical medium for OLT/CLT 300 (e.g., the control signal specifies a start time and an end time of the downstream transmission slot). In another embodiment, the control signal provides a periodic downstream time slot (e.g., the control signal specifies a start time, a duration, and a periodic time interval for the downstream transmission slot). In an embodiment, the control signal includes a MPCP GATE message.

EPON MAC module 302 is configured to control transmit PHY module 318, according to the control signal, to transmit a data signal during the downstream transmission slot to an ONU/CNU. Where the downstream transmission slot is periodic, EPON MAC module 302 is configured to control transmit PHY module 318 to transmit the data signal periodically in accordance with the periodic time interval of the downstream transmission slot.

In an embodiment, EPON MAC module 302 is configured to forward MAC layer data to transmit PHY module 318 in response to the control signal from EPON scheduler 304. In an embodiment, EPON MAC module 302 begins forwarding the MAC layer data to transmit PHY module 318 at a time that corresponds to a start time of the downstream transmission slot (e.g., at the start time or at a time shortly before the start time) and stops forwarding MAC layer data at a time that corresponds to an end time of the downstream transmission time (e.g., at a time shortly before the end time). In another embodiment, before the start time of the downstream transmission slot, EPON MAC module 302 is further configured to control transmit PHY module 318 to transmit a MPCP GATE message (e.g., the MPCP message received from EPON scheduler 304) identifying the downstream transmission slot over the physical medium. This allows the ONU(s)/CNU(s) connected to OLT/CLT 300 to anticipate receiving downstream traffic from OLT/CLT 300.

In an embodiment, transmit PHY module 318 includes a data detector 320 and a burst transmitter 322. EPON MAC module 302 can control burst transmitter 322 to turn on before a start time of the downstream transmission slot and to turn off after an end time of the downstream transmission slot. In an embodiment, data detector 320 is configured to detect the presence or absence of MAC layer data from EPON MAC module 302 and to control burst transmitter 322 responsive to the presence or absence of MAC layer data from EPON MAC module 302. Specifically, data detector 320 turns on burst transmitter 322 when MAC layer data is detected from EPON MAC module 302 and turns off burst transmitter 322 when MAC layer data is not detected from EPON MAC module 302.

In addition to enabling downstream transmission scheduling over the physical medium, OLT/CLT 300 can also provide upstream transmission scheduling over the same physical medium for ONU(s)/CNU(s) serviced by OLT/CLT 300. In an embodiment, EPON scheduler 304 is configured to receive a reservation message from a network unit (e.g., ONU/CNU) and to schedule an upstream transmission slot for the network unit responsive to the reservation message. The reservation message can be an MPCP Report message, for example.

In an embodiment, when the upstream transmission slot is adjacent to the downstream transmission slot allocated to OLT/CLT 300 (e.g., the upstream transmission slot occurs immediately before or after the downstream transmission slot), EPON scheduler 304 is configured to account for a turn-around-time over the physical medium between the downstream transmission slot and the upstream transmission slot. The turn-around-time corresponds to a time gap between a start time of the downstream transmission slot and a start time of the upstream transmission slot (or vice versa) introduced by EPON scheduler 304 to ensure that the downstream transmission from OLT/CLT 300 (or the upstream transmission from the network unit) reaches completely the other end of the physical medium (e.g., the last bit of the transmission is received at the other end) before the upstream transmission from the network unit (or the downstream transmission from OLT/CLT 300) begins. The turn-around-time ensures that OLT/CLT 300 and the ONU(s)/CNU(s) serviced by OLT/CLT 300 can share the physical medium without collision.

Figure 4:
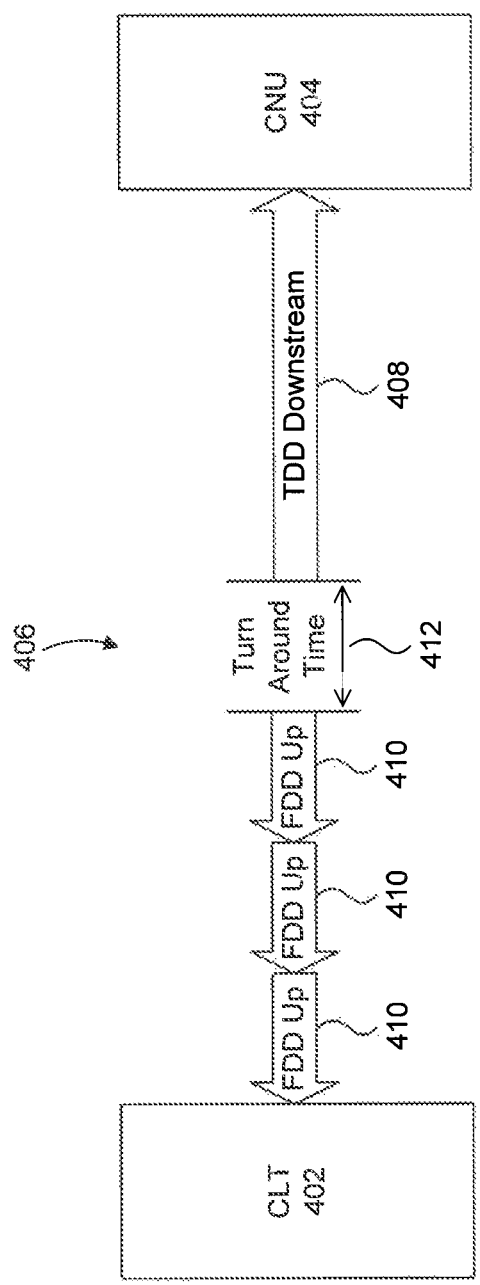
FIG. 4 is an example that illustrates an EPoC Time Division Duplex (TDD) mode according to an embodiment.

FIG. 4 is an example 400 that illustrates an EPoC Time Division Duplex (TDD) mode according to an embodiment. Example 400 is provided for the purpose of illustration only and is not limiting of embodiments. As shown in FIG. 4, example 400 illustrates an EPoC link, established over a coaxial cable 406, between a CLT 402 and a CNU 404. CLT 402 can be similar to CLT 300 described with respect to FIG. 3 above. CNU 404 can be similar to CNU 600 described below with respect to FIG. 6.

The TDD mode illustrated in FIG. 4 includes dividing the RF spectrum provided by coaxial cable 406 in time between a downstream communication channel, from CLT 402 to CNU 404, and an upstream communication channel, from CNU 404 (and any other CNUs being serviced by CLT 402) to CLT 402. At any time, the entire RF spectrum (all frequencies) of coaxial cable 406 can be used by either the downstream communication channel or the upstream communication channel. For example, as shown in FIG. 4, the entire RF spectrum of coaxial cable 406 can be used to transmit multiple upstream bursts 410 (which may or may not be adjacent in time) from CNU 404 (or any other CNU serviced by CLT 402). When the final upstream burst 410 is fully received by CLT 402, a downstream burst 408 can begin transmission from CLT 402 to CNU 404, thereby accounting for a turn-around-time 412 over coaxial cable 406. CLT 402 and CNU 404 both operate in a burst mode for both transmission and reception in this TDD mode.

The TDD mode illustrated in FIG. 4 is well-suited for situations in which the spectrum provided by the physical medium (e.g., optical fiber, coaxial cable, wireless channel) is not large enough to support the full-duplex EPoC FDD mode or EPON WDM mode. For example, the physical medium (or the portion of it dedicated to the EPON/EPoC link) can be a single wavelength optical fiber or a single frequency band coaxial cable. In these situations, splitting the physical medium into non-overlapping downstream and upstream channels can be technically unfeasible (or even impossible) and/or may violate the relevant EPON/EPoC standards.

Figure 5:
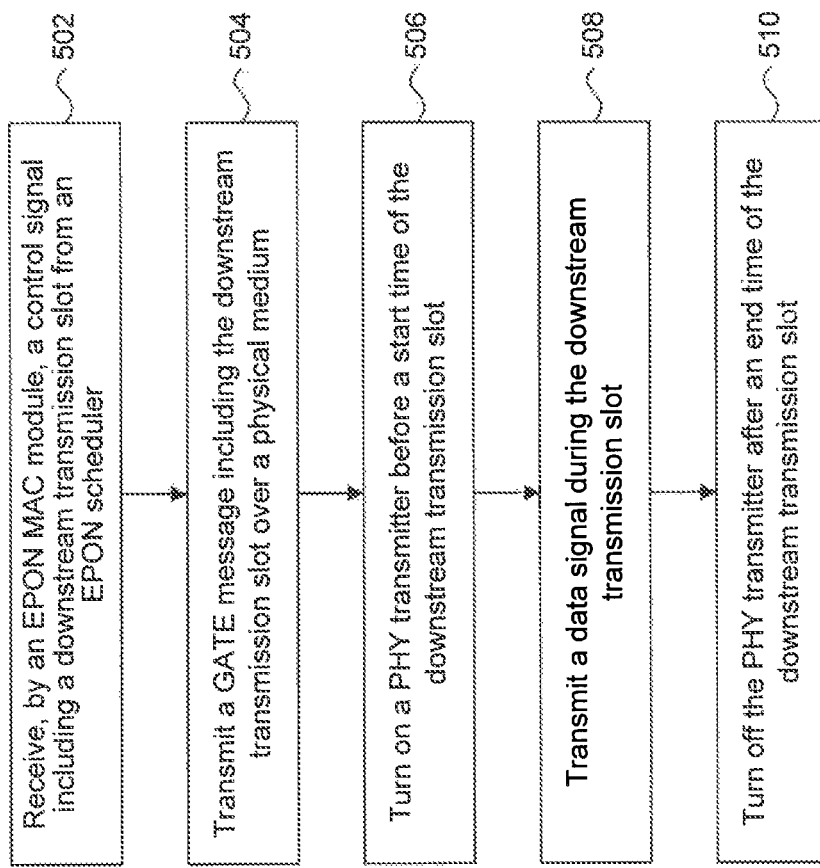
FIG. 5 is an example process according to an embodiment.

FIG. 5 is an example process 500 according to an embodiment. Example process 500 is provided for the purpose of illustration only and is not limiting of embodiments. Example process 500 can be used by an OLT/CLT, such as OLT/CLT 300, to implement TDD mode transmission to an ONU/CNU over a physical medium, such as an optical fiber, a coaxial cable, or a wireless interface.

As shown in FIG. 5, process 500 begins in step 502, which includes receiving, by an EPON MAC module of the OLT/CLT, a control signal identifying a downstream transmission slot on the physical medium from an EPON scheduler. In an embodiment, the control signal from the EPON scheduler is in response to a reservation message from the OLT/CLT, requesting the downstream transmission slot. In another embodiment, the control signal includes a MPCP GATE message.

Then, process 500 proceeds to step 504, which includes transmitting a MPCP GATE message identifying the downstream transmission slot over the physical medium. In an embodiment, step 504 includes transmitting the same MPCP GATE message received from the EPON schedule. Transmission of the MPCP message allows ONU(s)/CNU(s) connected to the OLT/CLT to anticipate receiving downstream traffic from the OLT/CLT during the downstream transmission slot.

Subsequently, in step 506, process 500 includes turning on a PHY transmitter before a start time of the downstream transmission slot. In an embodiment, step 506 includes starting to forward MAC layer data from the EPON MAC module to a transmit PHY module that includes the PHY transmitter. The detection of the presence of MAC layer data in the transmit PHY module causes the PHY transmitter to turn on. In an embodiment, the PHY transmitter is a burst transmitter, which can be turned on/off in a short time manner.

Then, in step 508, process 500 includes transmitting a data signal during the downstream transmission slot to the ONU/CNU. Process 500 terminates in step 510, which includes turning off the PHY transmitter after an end time of the downstream transmission slot. In an embodiment, step 510 includes stopping the forwarding of MAC layer data from the EPON MAC module to the transmit PHY module that includes the PHY transmitter. The detection of the absence of MAC layer data in the transmit PHY module causes the PHY transmitter to turn off.

Figure 6:
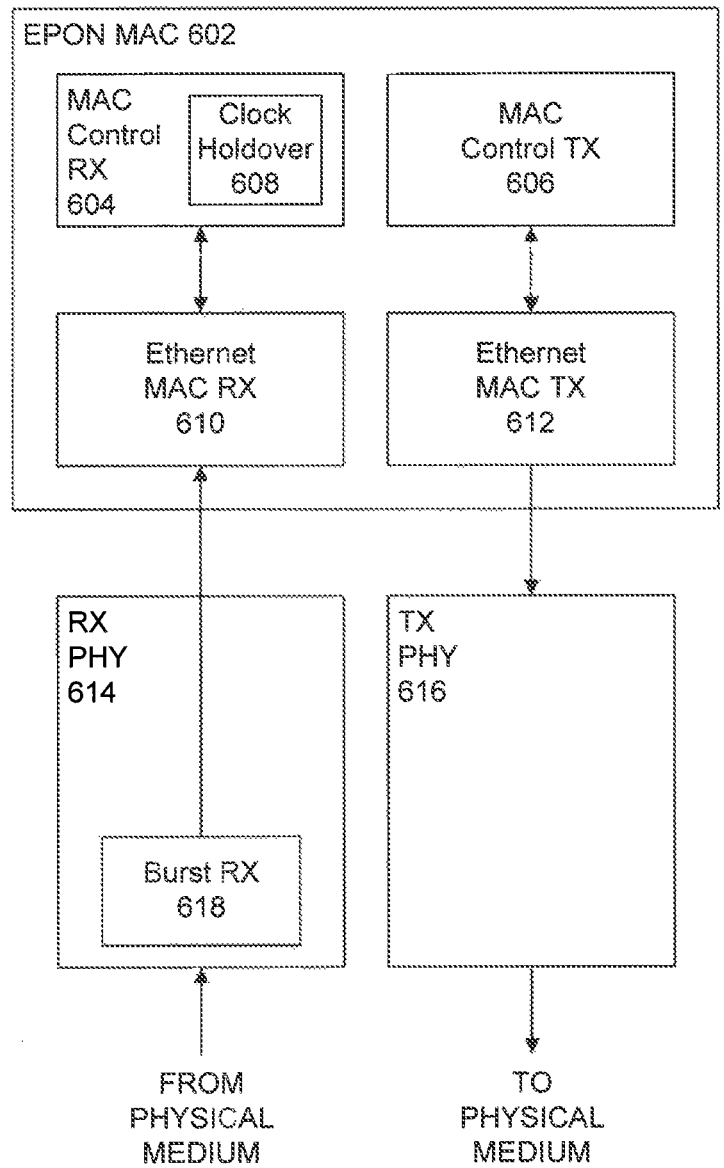
FIG. 6 is an example Optical Network Unit (ONU) or Coaxial Network Unit (CNU) according to an embodiment.

FIG. 6 is an example ONU or CNU 600 according to an embodiment. Example ONU/CNU 600 is provided for the purpose of illustration only and is not limiting of embodiments. ONU/CNU 600 can be used to enable an EPON/EPoC TDD mode as described above. As shown in FIG. 6, ONU/CNU 600 includes an EPON MAC module 602, a receive PHY module 614, and a transmit PHY module 616.

Receive PHY module 614 and transmit PHY module 616 can be implemented within a single PHY module, which can be an optical PHY, a coaxial PHY, or an RF PHY. Transmit PHY module 616 can implement a subscriber side transmit PHY layer as defined in the IEEE 802.3 standard specifications. Receive PHY module 614 can implement a subscriber side receive PHY layer as defined in the IEEE 802.3 standard specifications, modified to support a burst mode receive. In an embodiment, receive PHY module 614 includes a burst receiver 618, configured to receive burst signals over the physical medium from an OLT/CLT.

EPON MAC module 602 includes a MAC control receive module 604, a MAC control transmit module 606, an Ethernet MAC receive module 610, and an Ethernet MAC transmit module 612. EPON MAC module 602 can implement a subscriber side EPON MAC layer as defined in the IEEE 802.3 standard specifications. Additionally, EPON MAC module 602 is configured to control receive PHY module 614 to receive downstream bursts from the OLT/CLT. In an embodiment, EPON MAC module 602 is configured to receive an MPCP GATE message identifying a downstream transmission slot from the OLT/CLT, and to turn on/off burst receiver 618 in accordance with the downstream transmission slot.

Additionally, EPON MAC module 602 includes a clock holdover module 608, which can be implemented within MAC control receive module 604 or another module of EPON MAC module 602. Clock holdover module 608 is configured to maintain track of current system time in the absence of downstream transmission from the OLT/ONU. In typical WDM/FDD EPON/EPoC networks, the ONU/CNU derives timing from a continuous downstream signal transmitted by the OLT/CLT. In contrast, in TDD mode EPON/EPoC networks according to embodiments, the downstream is bursty and therefore system time cannot be derived from the downstream signal. Clock holdover module 608 is configured to maintain track of current system time even when no downstream signal is being received. In an embodiment, clock holdover module 608 implements a counter that is activated upon detecting the absence of the downstream signal. The counter counts up from the last known system time to maintain track of current system time. In another embodiment, the counter is activated at an end time of the downstream transmission slot received in the MPCP message.

Enabling an EPON/EPoC TDD mode as described above may also require additional modifications within EPON MAC module 602 and/or receive PHY module 614. For example, typical ONU/CNU implementations use a signal detect module (e.g., within the receive PHY module) for detecting when the link with the OLT/CLT goes down. In the EPON/EPoC TDD mode described herein, the signal detect module is disabled, omitted, or ignored because the link will appear to go down every time that downstream transmission is off. Instead, to detect link failure, EPON MAC module 602 can be used to detect the loss of MPCP messages over a predefined period.

Figure 7:
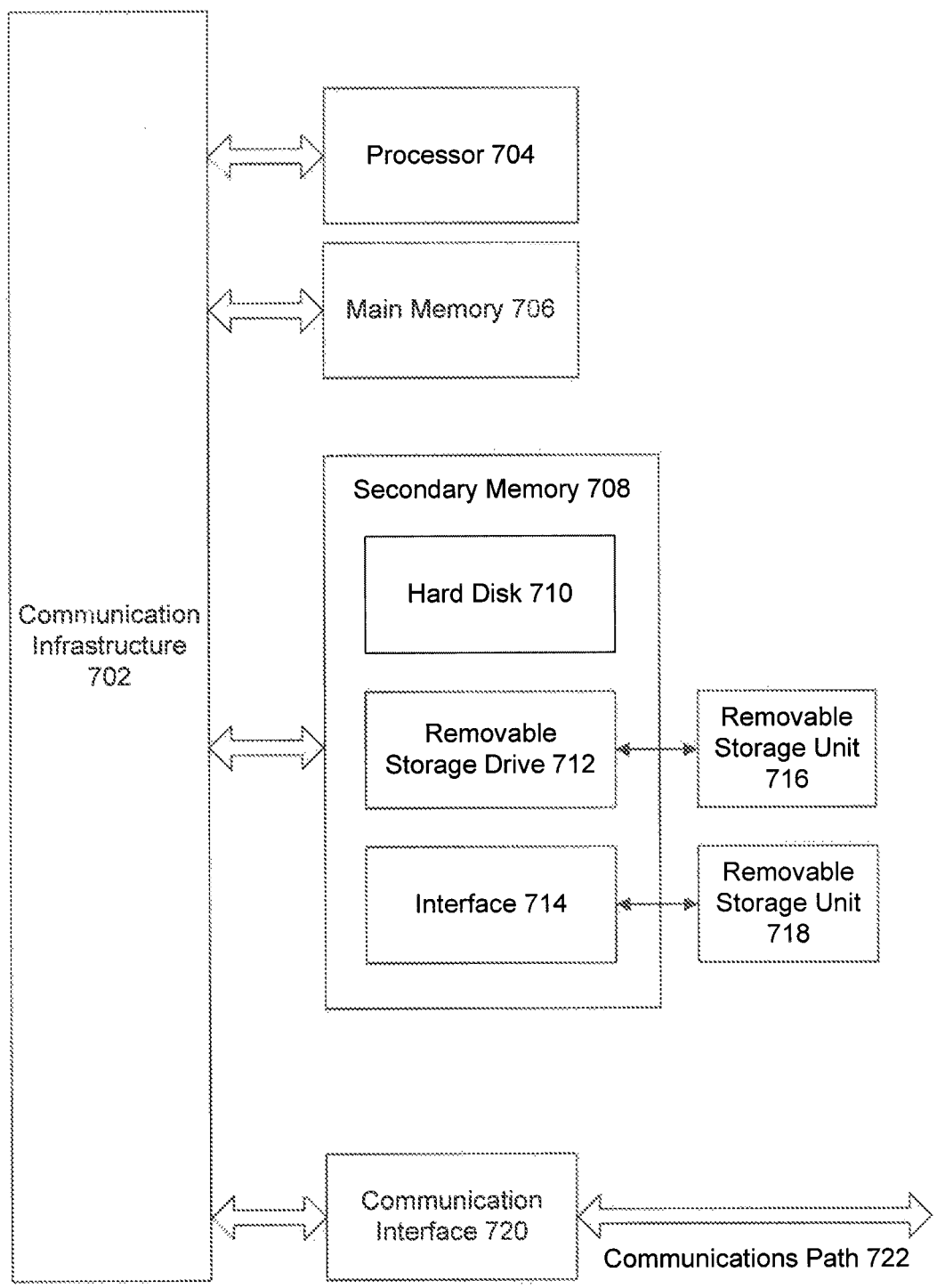
FIG. 7 illustrates an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 700 is shown in FIG. 7. Modules depicted in FIGS. 1-4 and 6 may execute on one or more computer systems 700. Furthermore, each of the steps of the flowcharts depicted in FIG. 5 can be implemented on one or more computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCMCIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A line terminal coupled via a physical medium to a network the line terminal comprising:
   a transmit physical layer (PRY) module, coupled to the physical medium;
   an Ethernet Passive Optical Network (EPON) scheduler configured to generate a control signal identifying a downstream transmission slot on the physical medium, wherein the downstream transmission slot is scheduled to not overlap in time with any upstream transmission slots on the physical medium; and
   an EPON Medium Access Control (MAC) module configured to receive, from the EPON scheduler, the control signal and to control the transmit PHY module, according to the control signal, to transmit a data signal during the downstream transmission slot to the network unit,
   wherein the transmit PHY module includes a burst transmitter, and wherein the EPON MAC module is farther configured to turn off the burst transmitter after an end time of the downstream transmission slot, so that the burst transmitter is turned off when, any upstream transmission slots occupy the physical medium.

2. The line terminal of claim 1, wherein the EPON MAC module is further configured to turn on the burst transmitter before a start time of the downstream transmission slot.

3. The line terminal of claim 2, wherein the EPON MAC module is further configured to forward MAC layer data to the transmit PHY module in accordance with the control signal, and wherein, the transmit PHY module includes a data detector configured to detect the presence or absence of the MAC layer data from the EPON MAC module and to control the burst transmitter responsive to the presence or absence of the MAC layer data from the EPON MAC module.

4. The line terminal of claim 1, wherein the control signal identifies a periodic time interval for the downstream transmission slot, and wherein the EPON MAC module is further configured to control the transmit PHY module to transmit the data signal periodically to the network unit in accordance with the periodic time interval.

5. The line terminal of claim 1, wherein the line terminal includes an Optical Line Terminal (OLT) or a Coaxial Line Terminal (CLT).

6. The line terminal of claim 1, wherein the network unit includes an Optical Network Unit (ON U) or a Coaxial Network Unit (CNU).

7. The line terminal of claim 1, wherein the physical medium includes one or more of: an optical fiber and a coaxial cable.

8. The line terminal of claim 1, wherein the physical medium is an optical fiber using a single wavelength.

9. A line terminal coupled via a physical medium to a network unit, the line terminal comprising:
   a transmit physical layer (PHY) module, coupled to the physical medium;
   an Ethernet Passive Optical Network (EPON) scheduler; and
   an EPON Medium Access Control (MAC) module configured to receive, from the EPON scheduler, a control signal identifying a downstream transmission slot on the physical medium, and to control the transmit PHY module, according to the control signal, to transmit a data signal during the downstream transmission slot to the network unit,
   wherein the EPON scheduler is configured to receive a reservation message from the EPON MAC module and to send the control signal to the EPON MAC module responsive to the reservation message.

10. The line terminal of claim 9, wherein the reservation message includes a desired time duration for the downstream transmission slot.

11. The line ten ii al of claim 9, herein the reservation message includes a Multi-Point Control Protocol (MPCP) Report message.

12. The line terminal of claim 9, wherein the control signal includes a Multi-Point Control Protocol (MPCP) GATE message.

13. The line terminal of claim 12, wherein the EPON MAC module is further configured to control the transmit PHY module to transmit the MPCP GATE message over the physical medium before a start time of the downstream transmission slot.

14. The line terminal of claim 9, wherein the EPON scheduler is further configured to receive a second reservation message that is received from the network unit, and to schedule an upstream transmission slot for the network unit responsive to the second reservation message.

15. The line terminal of claim 14, wherein the EPON scheduler is further configured to account for a turn-around-time over the physical medium between the downstream transmission slot and the upstream transmission slot.

16. The line terminal of claim 12, wherein the MPCP GATE message includes a size of a downstream queue of the EPON MAC module.

17. A method for transmission from an Optical Line Terminal (OLT) or a Coaxial Line Terminal (CLT) to a network unit over a physical medium, comprising:

receiving, by an Ethernet Passive Optical Network (EPON) Medium Access Control (MAC) module of the OLT or CLT, a control signal identifying a downstream transmission slot on the physical medium from an EPON scheduler, wherein the downstream transmission slot is scheduled to not overlap in time with any upstream transmission slots on the physical medium; and controlling, by the EPON MAC module, a physical layer (PHY) transmitter of the OLT or CLT to transmit a data signal during the downstream transmission slot to the network unit, wherein controlling the PHY transmitter of the OLT or CLT comprises turning off the PHY transmitter after an end time of the downstream transmission slot so that the PHY transmitter is turned off when any upstream transmission slots occupy the physical medium.

18. The method of claim 17, wherein controlling the PHY transmitter of the OLT or CLT comprises turning on the PHY transmitter before a start time of the downstream transmission slot.

19. The method of claim 17, wherein the control signal includes a Multi-Point Control Protocol (MPCP) GATE message, the method further comprising:
    transmitting the MPCP GATE message over the physical medium before a start time of the downstream transmissions slot.

20. The method of claim 17, further comprising:
receiving a reservation message from the network unit; and
scheduling, responsive to the reservation message, an upstream transmission slot for the network unit, wherein scheduling the upstream transmission slot comprises accounting for a turn-around-time over the physical medium between the downstream transmission slot and the upstream transmission slot.

* * * * *